Patented Oct. 31, 1939

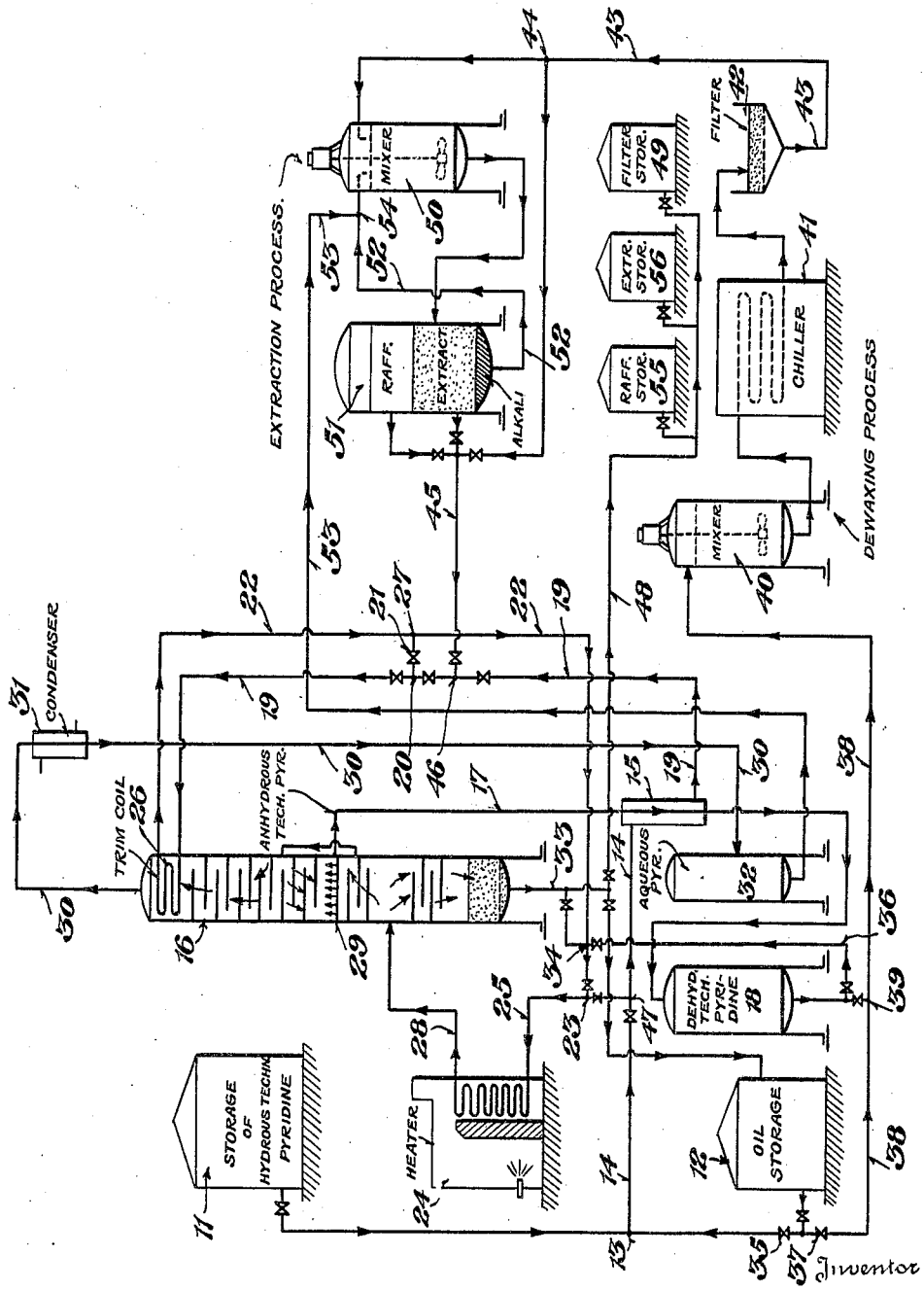

2,178,506

UNITED STATES PATENT OFFICE 2,178,506

METHOD OF RECOVERING PYRIDINE IN THE SOLVENT REFINING OF OILS

James W. Weir, Los Angeles, Calif., assignor to Edeleanu Gesellschaft, m. b. H., Berlin, Germany, a corporation of Germany Application May 28, 1937, Serial No. 145,186

1 Claim. (Cl. 196—13)

The invention comprises improvements pertaining to the subject-matter of patent application Serial No. 84,163 entitled "Solvent refining of oils" and patent application Serial No. 84,164 entitled "Solvent refining and dewaxing of oils", filed by me on the eighth day of June, 1936, now U. S. Patents Nos. 2,154,189 and 2,154,190, respectively, both dated April 11, 1939, and which includes a mode of procedure wherein lubricating oils are treated with pyridine and aqueous alkali during solvent extraction. The pyridine absorbs water during this process and it is essential to separate this aqueous pyridine solution into its components to be re-used as dewaxing solvent.

The invention aims to provide effective means for separating anhydrous pyridine from aqueous solutions thereof, and for increasing the yield of anhydrous pyridine and low boiling homologues thereof found in commercial pyridine, to enable a pyridine solvent to be successfully used in a cyclical process of refining oils.

Pyridine and pyridine homologues form azeotropic mixtures with water, and it is necessary to use chemical drying agents followed by redistillation to produce substantially anhydrous compounds. This is a rather expensive procedure but I have discovered a method of dehydrating pyridine or pyridine homologues during the solvent recovery operation that is operable and produces excellent results. Referring again to Patent No. 2,154,190 I point out that the dewaxing filtrate is passed directly into the solvent extraction plant to be contacted with aqueous alkali solution. The solvent in the filtrate absorbs water during this treatment and it is therefore necessary to remove this water from at least part of the solvent, i. e., that part of the solvent which it is intended to use again as a dewaxing medium.

The azeotropic mixture of pyridine and water gives a liquid and vapor composition curve showing a minimum boiling point of 92.6° C. The constant boiling mixture contains 57% by weight of pyridine and 43% of water. Since the amount of water absorbed during the solvent treatment of the oil while contacted with the aqueous alkali as set forth in Patent No. 2,154,190 rarely exceeds 10%, it is seen that the composition of the charging mixture to the still (water-pyridine), falls into the right hand section of the vapor-liquid composition diagram, wherein the higher boiling mixture (pyridine or pyridine homologues) is plotted at the right hand side of the diagram. This position of the charging mixture (water-pyridine) in the diagram is of importance since it permits the separation of the mixture into (A) a constant boiling mixture of pyridine and water as a distillate and (B) substantially anhydrous pyridine as bottoms. If the charging mixture to the still was composed of less than 57% of pyridine it would only be possible to separate such a mixture into pure water and a constant boiling mixture of pyridine and water, which mixture would be unsuitable for re-use as a dewaxing agent.

I have observed now that the separation of the aqueous pyridine solution, having substantially the position in the vapor-liquid composition diagram of 90% pyridine and 10% water or any mixture of pyridine and water containing from 57 to 100% of pyridine, can be separated into an aqueous pyridine fraction and an anhydrous pyridine fraction much more easily in the presence of oil, such as for example the raffinate portion of the original lube oil charging stock, the extract portion or the filtrate portion dissolved in the pyridine or pyridine type solvent. The efficiency of this method of separation depends upon the amount of oil present and I consider under the term "efficiency" both heat economy and minimum amount of aqueous pyridine produced during the process of distillation. I may therefore add to the extract phase-solvent mixture additional "solvent-free extract" obtained from prior production, so as to obtain a minimum of aqueous pyridine overhead distillate, a maximum middle cut of substantially anhydrous pyridine, and solvent-free raffinate, extract, or filtered stock as bottoms, when accomplishing separation continuously in a fractionating tower or column. I may further add to a charging mixture consisting of oil, pyridine and water, a predetermined amount of anhydrous pyridine, before sending the mixture to the distillation apparatus.

The aqueous pyridine distillate obtained during the process of separation can be used again as a diluent for the alkali solution, as described in Patent No. 2,154,190. The anhydrous pyridine is re-used for dewaxing operations.

A suitable arrangement of apparatus for carrying out the invention is illustrated in the accompanying diagram, wherein the same fractionating column is used for dehydrating pyridine, and for raffinate topping and removal of solvent from extract in a combined oil dewaxing and extracting plant. For convenience, the process may be described under these three operations, taking them singly, namely, dehydrating pyridine, dewaxing oil and extracting oil, although the process is not necessarily carried out in this order, and all three operations may be performed simultaneously by supplying additional fractionating equipment.

(1) Dehydrating of aqueous technical pyridine

The wet pyridine supply material is contained in tank 11. The oil required in the process may be the waxy charging stock or any other product to be processed later on. This oil is conveniently stored in tank 12. Pyridine and oil are mixed in the proper proportions at junction point 13 of the supply pipes from these tanks, and thence flow through pipe 14 into heat exchanger 15, where the mixture is heated by passing countercurrent to the hot anyhdrous pyridine that flows from a tray in the fractionating tower 16 through pipe line 17 into the dehydrated pyridine storage tank 18.

The oil-pyridine mixture leaves heat exchanger 15 through pipe line 19 to junction point 20, at which point part of the oily mixture may be by-passed through valve 21 into pipe line 22 and continues (as shown by the arrows in the diagram) to junction point 23 and to the heater 24 through line 25. Returning to the by-pass junction point 20, it will be observed that the continuation of pipe line 19 leads to the trim coil 26 in the top of the fractionating column. The fluid passing through this coil 26 is still cool enough to condense pyridine-water vapors ascending the column, since heat exchanger 15 transfers heat from liquid to liquid only. The warmed mixture emerges from the fractionating column after having passed through trim coil 26 through a continuation of the pipe line 22 and joins the by-pass line 21 at junction point 27 to continue to junction point 23 at the heater inlet. The temperature at the column top can therefore be controlled by means of this by-pass arrangement, the less oil mixture that is by-passed the more that goes through the trim coil and the lower the temperature maintained therein.

The oil-pyridine mixture leaves the heater through pipe line 28 and enters the lower part of the fractionator column 16 at a predetermined temperature. This temperature is maintained sufficiently high to cause all of the pyridine-water vapors to distill and ascend the column. The oil will collect at the bottom of the column, and the anhydrous pyridine will condense at an intermediate point and be trapped on the plate 29 from which it is withdrawn through pipe line 17 to storage tank 18. The aqueous pyridine fraction leaves the column at the top through pipe line 30 and passes through a water cooled condenser 31, where it condenses and continues through pipe line 30 into the aqueous pyridine storage tank 32. The oil at the bottom of the column is withdrawn through pipe line 33 either back into the oil storage tank 12 or it may be partly or entirely recirculated through the heater 24 by conducting the hot oil to junction point 34 with pipe line 22 and from there on to junction point 23 and into pipe line 25. If all of the hot oil is recirculated, the feed valve 35 at the oil storage tank 12 is of course closed.

Should it be desired to add anhydrous pyridine to the charge entering the heater, it will only be necessary to bleed some of this material through pipe line 36 back into the heater inlet circuit through the junction point 34.

(2) Dewaxing wax-containing oil

To enable the apparatus to be used for dewaxing, the valve 35 in the pipe line leading to the junction point 13, and the valve at the storage tank 11 for hydrous pyridine are both closed. The waxy lubricating oil stock, which is contained in oil storage tank 12, is withdrawn through valve 37 into pipe line 38, where it is mixed with anhydrous pyridine from storage tank 18 at junction point 39, and the mixture passes through a continuation of pipe line 38 to mixer 40, from there to chiller 41, and on to filter 42. The filtered oil-solvent mixture is carried off through pipe line 43 to junction point 44. From this point the wax-free material or filtrate, may either be run through the extraction plant or it may be passed directly to the distillation equipment for recovering the solvent through pipe line 45 to junction point 46 with pipe line 19. From there either part of the filtrate may be caused to go over through the trim coil 26 and so into pipe line 22, or it may go entirely through pipe line 19 (in the opposite direction as was previously described for the production of anyhdous pyridine) through heat exchanger 15 and pipe line 14 to junction point 47 and from there on to junction point 23 and pipe line 25 and so through the heater 24.

The entire filtrate may, however, go through the trim-coil 26 or it may be by-passed through valve 21 to pipe line 22 so as to follow the direct course to the heater 24 as previously described. In either case the heat exchanger 15 is entirely cut out from the circuit which, usually, would not be desirable. The same procedure for adding additional hot oil from the bottom of the column, prior to feeding the filtrate to the heater, can be followed as was previously described during the dehydration step. It is of course apparent that during the dewaxing operation no water enters the system and no aqueous pyridine overhead distillate would be collected. That part of the topped filtrate which would not be recycled through the heater 24 from the column bottom, or, if desired, the entire quantity of material, would be withdrawn through pipe line 48 to topped filtrate storage tank 49.

(3) Extracting de-waxed oil and solvent recovery

If solvent extraction is to follow the dewaxing step, the filtrate in line 43 passes on to the mixer 50, where it is contacted with aqueous alkali solution, which solution is continuously recycled from the settler tank 51 through pipe line 52. By this procedure the anhydrous pyridine is converted into a selective solvent such as described in my Patents Nos. 2,154,189 and 2,154,190. Since the aqueous alkali solution coming from settler tank 51 loses water to the pyridine in the mixer, it becomes concentrated, which is undesirable. It is therefore necessary to bring in make up water into the mixer so as to maintain the proper equilibrium conditions between the solvent mixture and aqueous alkali solution. This is very simply accomplished by adding to the alkali solution coming from settler 51 prior to entering the mixer 50 the proper amount of aqueous pyridine from storage tank 32 through pipe line 53 terminating in a junction 54 with pipe line 52 near its entrance to the mixer. The pyridine water mixture in storage tank 32 contains a large percentage of water and is therefore able to give up the greater part of its water content to the aqueous alkali solution, and thenceforth to the anhydrous pyridine contained in the filtrate entering the mixer 50. Once the process is in circulation, equilibrium conditions are maintained.

In order to finish processing the two oil-solvent phases left in the settler tank 51, both phases are subjected to the same treatment of fractional distillation to recover the solvent therefrom. The raffinate solution and the extract solution may each utilize separate distillation units; but as is shown in the diagram, the fractionation column 16 serves all purposes and it suffices to state that instead of the filtrate, the raffinate or extract solution may be put through the column analogous to the procedure described for the filtrate. The topped oils would finally be drawn off through pipe line 48 to their respective storage tanks 55, 56.

The pyridine which I preferably intend to use as a dewaxing and selective solvent as set forth in Patents Nos. 2,154,189 and 2,154,190 is a fraction of a product which is known as technical pyridine or pyridine bases. The primary material is composed of pyridine homologues, such as for example $\alpha$ and $\beta$ methyl pyridines or picolines. Such a mixture has a relatively wide boiling range and contains fractions having an end boiling point up to and often above 180° C.

I have fractionated this material and prepared a cut having an end boiling point of approximately 145° C. at about 80 vol.-per cent yield. I prefer to use this cut as a dewaxing medium since it is easily removed from the oil by distillation, and in particular on account of the low miscibility temperatures of this fraction with oils which permit dewaxing operations at extremely low temperatures.

When I refer to pyridine, or to technical pyridine, in this specification, in the drawing and in the claim, I mean a commercial pyridine having an end boiling point of 145° C. and containing higher homologues of pyridine, such as picolines, besides pyridine itself.

The procedure set forth in this specification enables the production of anhydrous pyridine in sufficient quantity to permit continuous operation of the entire processing procedure described in my Patent 2,154,190. This procedure also enables the production of solvent fractions obtained from technical pyridine which show superior results as treating reagents.

I claim:

In the process of refining a wax-containing mineral oil comprising dewaxing said oil by means of anhydrous technical pyridine as the diluent and admixing the dewaxed oil-pyridine solution thereby obtained with an aqueous alkaline solution for the purpose of producing a raffinate phase and an extract phase whereby both phases absorb water from said aqueous alkaline solution, the step which consists in distilling said water-containing raffinate and extract solutions separately, thereby obtaining a greater yield of anhydrous pyridine to be returned to the dewaxing process than is obtainable in the absence of raffinate oil or extract oil in the distillation step.

JAMES W. WEIR.